US012691608B2

(12) United States Patent
Datema et al.

(10) Patent No.: US 12,691,608 B2
(45) Date of Patent: Jul. 28, 2026

(54) MIXER REMOTE QUALITY MANAGER

(71) Applicant: Oshkosh Corporation, Oshkosh, WI (US)

(72) Inventors: Bryan Datema, Rochester, MN (US); Zhenyi Wei, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 1064 days.

(21) Appl. No.: 17/745,460

(22) Filed: May 16, 2022

(65) Prior Publication Data

US 2022/0388198 A1 Dec. 8, 2022

Related U.S. Application Data

(60) Provisional application No. 63/197,204, filed on Jun. 4, 2021.

(51) Int. Cl.
*B28C 5/42* (2006.01)

(52) U.S. Cl.
CPC .............. *B28C 5/422* (2013.01); *B28C 5/421* (2013.01); *B28C 5/4237* (2013.01); *B28C 5/4248* (2013.01); *B28C 5/4272* (2013.01)

(58) Field of Classification Search
CPC ....... B28C 5/4213; B28C 5/468; B28C 5/422; B28C 5/4237; B28C 5/4272;
(Continued)

(56) References Cited

U.S. PATENT DOCUMENTS 5,713,663 A * 2/1998 Zandberg .............. B28C 7/0454 366/8
5,752,768 A 5/1998 Assh
(Continued)

FOREIGN PATENT DOCUMENTS

WO WO-2009126138 A1 * 10/2009 ............. B28C 7/026
WO WO-2025196402 A1 * 9/2025 ............. B28C 7/028

OTHER PUBLICATIONS

Suprenant BA: “Adjusting Slump in the 11 Field”, Concrete Construction, Concrete Construction Publications, Addison, IL, US, Jan. 1, 1994 (Jan. 1, 1994), pp. 1-4, XP002259467, ISSN: 0010-5333 second page, first paragraph.

*Primary Examiner* — Charles Cooley
(74) *Attorney, Agent, or Firm* — Foley & Lardner LLP

(57) ABSTRACT

A mixer vehicle system includes a mixer vehicle and a remote management system. The mixer vehicle includes a chassis and a vehicle body. The vehicle body comprises a plurality of subcomponents. The plurality of subcomponents includes a cabin, a mixing drum, a charge hopper, and a chute. The mixing drum is movable relative to the chassis to agitate a mixture. The charge hopper is movable relative to an aperture of the mixing drum. The chute is pivotally coupled to the mixer vehicle. The remote management system is configured to monitor and adjust a property of the mixture. The remote management system includes a sensor and a device. The sensor is configured to detect information corresponding to the property of the mixture and generate an input signal. The device is configured to recover a signal from the remote quality management system and cause at least one mixture property to change.

15 Claims, 7 Drawing Sheets

(58) Field of Classification Search

CPC ..... B28C 5/4203; B28C 5/4251; B28C 5/421; B28C 5/4248; B28C 7/024; B28C 7/0418; B28C 9/0463; B60P 3/16; B60K 11/085; B62D 21/02; B62D 25/10; B62D 33/06; B60R 3/00

USPC ........................................................ 366/60–61

See application file for complete search history.

(56) References Cited

U.S. PATENT DOCUMENTS

| | | | | |
|---|---|---|---|---|
| 8,020,431 | B2 | 9/2011 | Cooley et al. | |
| 8,311,678 | B2 * | 11/2012 | Koehler | G05D 21/02 700/285 |
| 8,858,061 | B2 * | 10/2014 | Berman | B28C 5/0893 366/12 |
| 9,533,429 | B2 * | 1/2017 | Phares | B28C 7/0422 |
| 9,789,629 | B2 * | 10/2017 | Koehler | G05D 21/02 |
| 10,184,928 | B2 * | 1/2019 | Radjy | G01N 33/383 |
| 10,414,067 | B2 | 9/2019 | Datema et al. | |
| 10,901,409 | B2 | 1/2021 | Datema et al. | |
| 12,415,295 | B2 * | 9/2025 | Steckling | B28C 5/422 |
| 12,510,530 | B2 * | 12/2025 | Newton | G01N 27/02 |
| 2008/0205188 | A1 | 8/2008 | Lindblom et al. | |
| 2009/0050438 | A1 | 2/2009 | Gillmore et al. | |
| 2009/0050439 | A1 | 2/2009 | Gillmore et al. | |
| 2009/0154287 | A1 | 6/2009 | Lindblom et al. | |
| 2011/0088599 | A1 * | 4/2011 | Koyata | C04B 40/0039 106/803 |
| 2011/0320040 | A1 * | 12/2011 | Koehler | B28C 5/422 700/265 |
| 2013/0107656 | A1 | 5/2013 | Datema et al. | |
| 2014/0107844 | A1 * | 4/2014 | Koehler | B28C 7/026 700/265 |
| 2015/0159564 | A1 | 6/2015 | Wildgrube et al. | |
| 2016/0355441 | A1 * | 12/2016 | Tregger | C04B 40/0032 |
| 2017/0297425 | A1 | 10/2017 | Wildgrube et al. | |
| 2017/0361491 | A1 | 12/2017 | Datema et al. | |
| 2017/0361492 | A1 | 12/2017 | Datema et al. | |
| 2018/0029934 | A1 | 2/2018 | Monkman et al. | |
| 2019/0091890 | A1 | 3/2019 | Rocholl et al. | |
| 2019/0121353 | A1 | 4/2019 | Datema et al. | |
| 2019/0325220 | A1 | 10/2019 | Wildgrube et al. | |
| 2019/0344475 | A1 | 11/2019 | Datema et al. | |
| 2020/0078986 | A1 | 3/2020 | Clifton et al. | |
| 2020/0094671 | A1 | 3/2020 | Wildgrube et al. | |
| 2020/0230841 | A1 | 7/2020 | Datema et al. | |
| 2020/0230842 | A1 | 7/2020 | Datema et al. | |
| 2020/0265656 | A1 | 8/2020 | Koga et al. | |
| 2020/0346657 | A1 | 11/2020 | Clifton et al. | |
| 2020/0398857 | A1 | 12/2020 | Clifton et al. | |
| 2020/0401807 | A1 | 12/2020 | Wildgrube et al. | |
| 2020/0402325 | A1 | 12/2020 | Koga et al. | |
| 2021/0031407 | A1 * | 2/2021 | Roberts | B28C 5/4237 |
| 2021/0039719 | A1 | 2/2021 | Datema et al. | |
| 2021/0069934 | A1 | 3/2021 | Rocholl et al. | |
| 2021/0124347 | A1 | 4/2021 | Datema et al. | |
| 2021/0162630 | A1 | 6/2021 | Clifton et al. | |
| 2021/0213642 | A1 | 7/2021 | Datema et al. | |
| 2021/0225095 | A1 | 7/2021 | Koga et al. | |
| 2021/0229320 | A1 | 7/2021 | Datema et al. | |
| 2021/0229321 | A1 | 7/2021 | Datema et al. | |
| 2021/0237311 | A1 | 8/2021 | Datema | |
| 2021/0237312 | A1 | 8/2021 | Datema et al. | |
| 2021/0252969 | A1 | 8/2021 | Wildgrube et al. | |
| 2021/0271884 | A1 | 9/2021 | Wildgrube et al. | |
| 2021/0276222 | A1 | 9/2021 | Datema | |
| 2021/0316740 | A1 | 10/2021 | Clifton et al. | |
| 2021/0316741 | A1 | 10/2021 | Clifton et al. | |
| 2021/0345062 | A1 | 11/2021 | Koga et al. | |
| 2021/0394394 | A1 | 12/2021 | Datema et al. | |
| 2021/0407222 | A1 | 12/2021 | Koga et al. | |
| 2022/0097527 | A1 | 3/2022 | Koga et al. | |
| 2022/0097961 | A1 | 3/2022 | Koga et al. | |
| 2022/0097964 | A1 | 3/2022 | Koga et al. | |
| 2022/0143869 | A1 * | 5/2022 | Steckling | B28C 5/4248 |
| 2022/0162004 | A1 | 5/2022 | Datema et al. | |
| 2022/0185582 | A1 | 6/2022 | Koga et al. | |
| 2022/0388198 | A1 * | 12/2022 | Datema | B28C 7/0418 |
| 2025/0282079 | A1 * | 9/2025 | Datema | B28C 5/4217 |

* cited by examiner

MIXER REMOTE QUALITY MANAGER

CROSS-REFERENCE TO RELATED PATENT APPLICATIONS

This application claims priority from U.S. Provisional Application No. 63/197,204, filed Jun. 4, 2021, incorporated herein by reference in its entirety.

BACKGROUND

The present disclosure relates generally to the management of the contents of a mixer vehicle. More specifically, the present disclosure relates to remote management of the contents of the mixer vehicle to ensure the contents of the mixer vehicle are correct when arriving at a destination.

SUMMARY OF THE INVENTION

One exemplary embodiment of the invention relates to a mixer vehicle system including a mixer vehicle and a remote management system. The mixer vehicle includes a chassis supporting a plurality of wheels. The mixer vehicle includes a vehicle body supported by the chassis. The vehicle body includes a plurality of subcomponents. The plurality of subcomponents includes a cabin configured to house one or more operators of the mixer vehicle. The plurality of subcomponents includes a mixing drum defining an aperture and an internal volume. The mixing drum is movable relative to the chassis to agitate a mixture stored in the mixing drum. The plurality of subcomponents includes a charge hopper positioned proximate the aperture. The charge hopper is movable relative to the aperture. The plurality of subcomponents includes a chute positioned proximate the aperture and beneath the charge hopper. The chute is pivotally coupled to the mixer vehicle. The remote management system is configured to monitor and adjust at least one property of the mixture. The remote management system includes a sensor and a device. The sensor is coupled with the mixer vehicle. The sensor is configured to detect information corresponding to the at least one property of the mixture and generate an input signal indicating the information. The device is communicably coupled with the sensor. The device is configured to recover a signal from the remote quality management system and cause at least one property of the mixture to change.

Another exemplary embodiment of the invention relates to a method including detecting, by a remote management system, information corresponding to a mixture contained in a mixing drum of a mixer vehicle. The method includes providing, by the remote management system, the information corresponding to the mixture to a user of the remote management system. The method includes receiving, by the remote management system, input from the user of the device. The input includes instructions for adjusting at least one property of the mixture. The method includes generating, by the remote management system, an output based, in part, on the input received from the user of the remote management system.

DETAILED DESCRIPTION

Figure 1A:
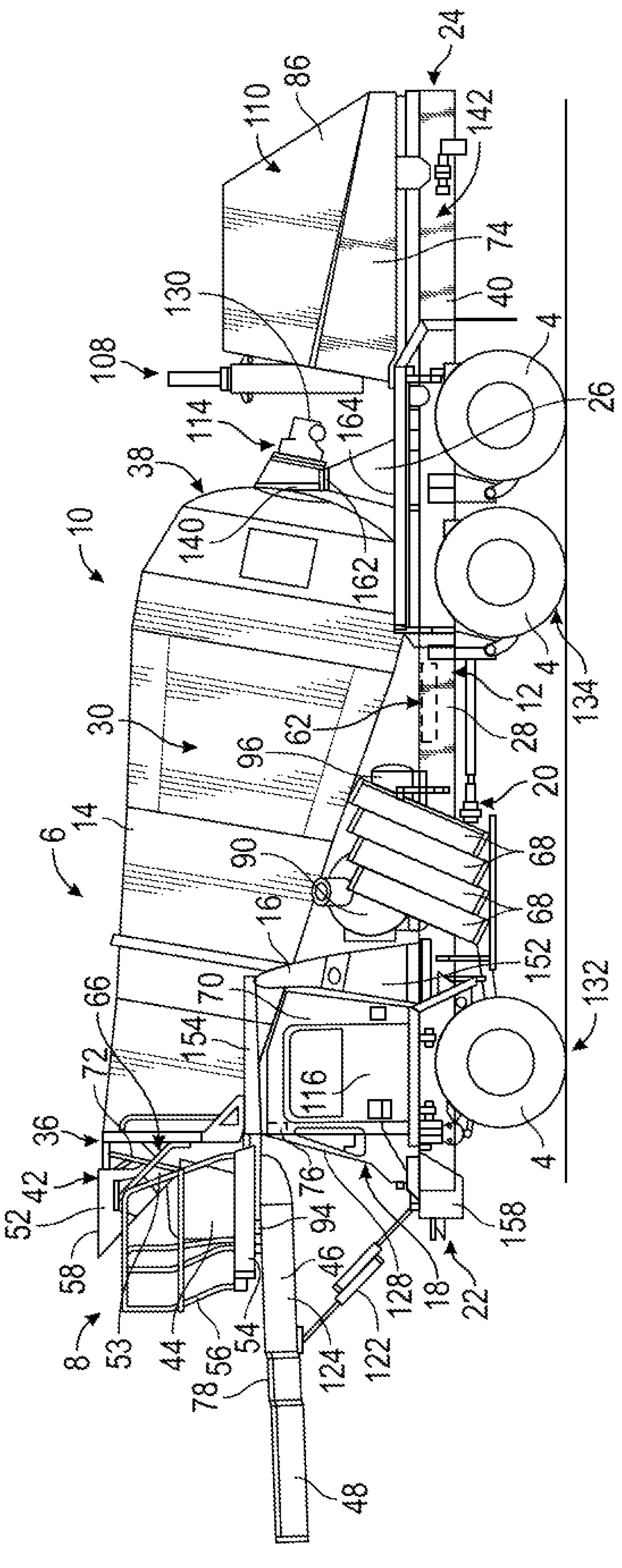
FIG. 1A is a side view of a mixer truck, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

A quality manager can employ embodiments of the remote management system disclosed herein to manage the quality of a mixture (e.g., cement) in a mixer vehicle from a remote location. Managing the quality of a mixture can include monitoring and adjusting the properties of the mixture (e.g., temperature, viscosity, water-cement ratio). The remote management system does not require input from an operator or driver of the mixer vehicle, but can still allow such input if desired. The quality manger can be any person who knows and understands the specification requirements of a mixture for a project (e.g., the properties the mixture needs to complete a project according to specified standards). For example, the quality manger can be someone associated with the supplier of the mixture (e.g., a concrete company) or associated with the recipient of the mixture (e.g., a customer).

Mixer vehicles can be used to transport mixtures to different destinations for different projects. Establishing and maintaining an appropriate mixture with specification-approved properties can include monitoring and adjusting the properties of the mixture during the time between loading the mixture at a supplier's facility (e.g., a concrete plant) and unloading the mixture at a customer's facility (e.g., a jobsite). Several systems and subcomponents of the mixer vehicles can be configured to establish and maintain a mixture with specific properties. For example, selectively activating or moving the systems and subcomponents of the mixing vehicle can provide the necessary adjustments to provide a mixture with specific properties. For example, the mixer vehicle can include a material supply system configured selectively supply material (e.g., water, chemicals, addmixtures) to the mixing drum. For example, the material supply system can supply water from a water tank to the mixing drum of a mixer vehicle to mix with the mixture such that the water-cement ratio of the mixture satisfies a specification requirement. The activation of the material supply system can be done remotely via communication between a device and a receiver associated with the material supply system (e.g., capable of controlling the water supply system). In another embodiment, the material supply system can add chemicals or other additives to the mixture. The communication can include a wireless connection such that information, signals, etc. are transmitted between the device and the receiver across a network (e.g., via Clearsky).

The remote management system can include sensors and devices to provide real-time information corresponding to the properties of a mixture within a mixer vehicle to facilitate the management of the mixture by a remote quality manager. For example, the mixer vehicle can include sensors to detect information regarding hydraulic pressure, drum speed, slump/viscosity, water-cement ratio, volume, temperature, location, and distance to a destination, among others. A quality manager can compare the information detected by the sensors with specification requirements associated with a project. If, based on the information detected by the sensors, a property of the mixture does not satisfy the specification requirements, the quality manager can adjust the property by selectively controlling systems and subcomponents of the mixer vehicle from a remote location (e.g., quality manager does not have to physically touch the vehicle or any system or subcomponent thereof to make the adjustment). For example, the quality manager can direct the necessary subcomponents of the mixer vehicle to transfer an appropriate amount of water from a water tank to a mixing drum to adjust a water-cement ratio that is below a specification requirement without the quality manager ever touching or being near the vehicle. The appropriate adjustment can be determined and performed while the quality manager is at a remote location relative to the mixer vehicle. By facilitating remote adjustments to correct mixture properties, the quality management system can ensure that the mixture satisfies the specification requirements when the mixer vehicle arrives at a jobsite.

Figure 1B:
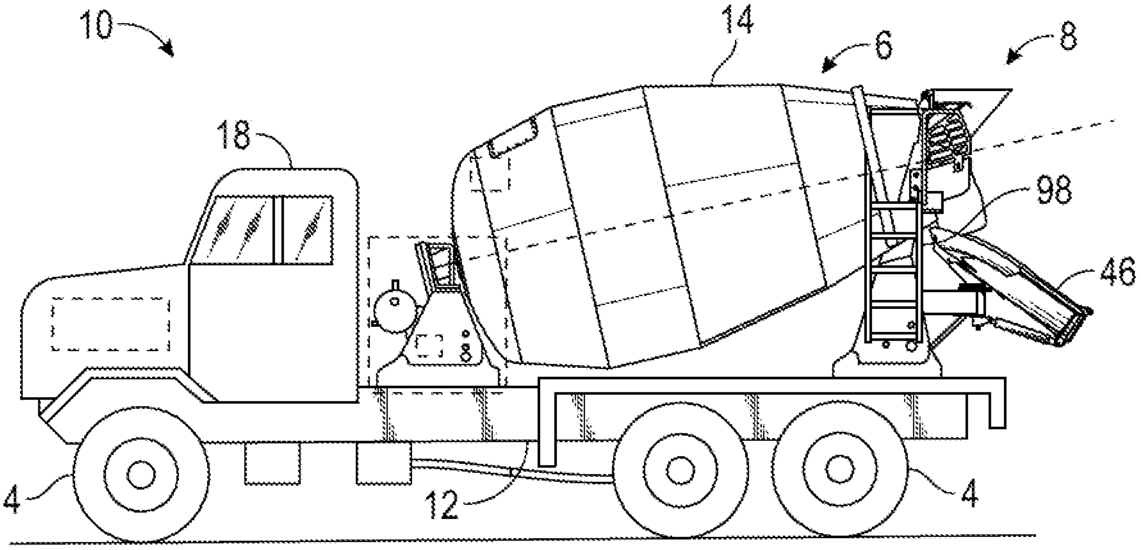
FIG. 1B is a side view of a mixer truck, according to an exemplary embodiment.
Figure 1C:
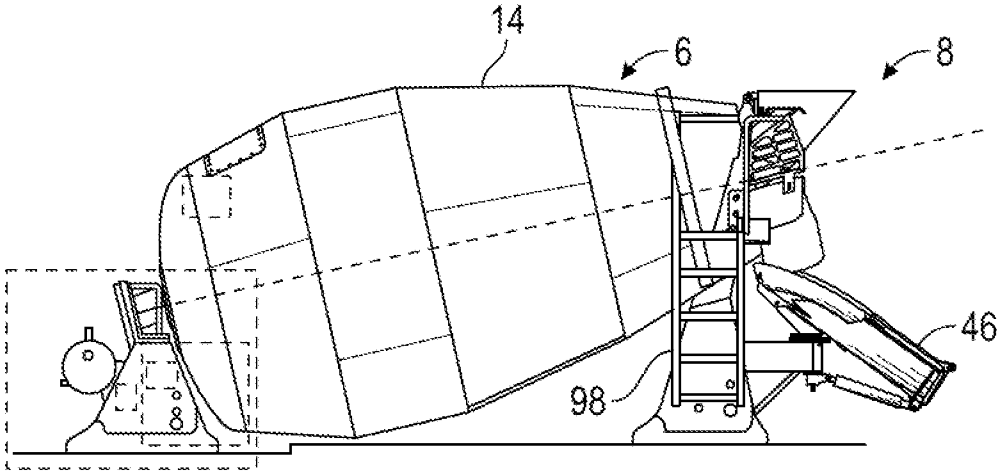
FIG. 1C is a side view of a drum assembly of a mixer truck, according to an exemplary embodiment.
Figure 2:
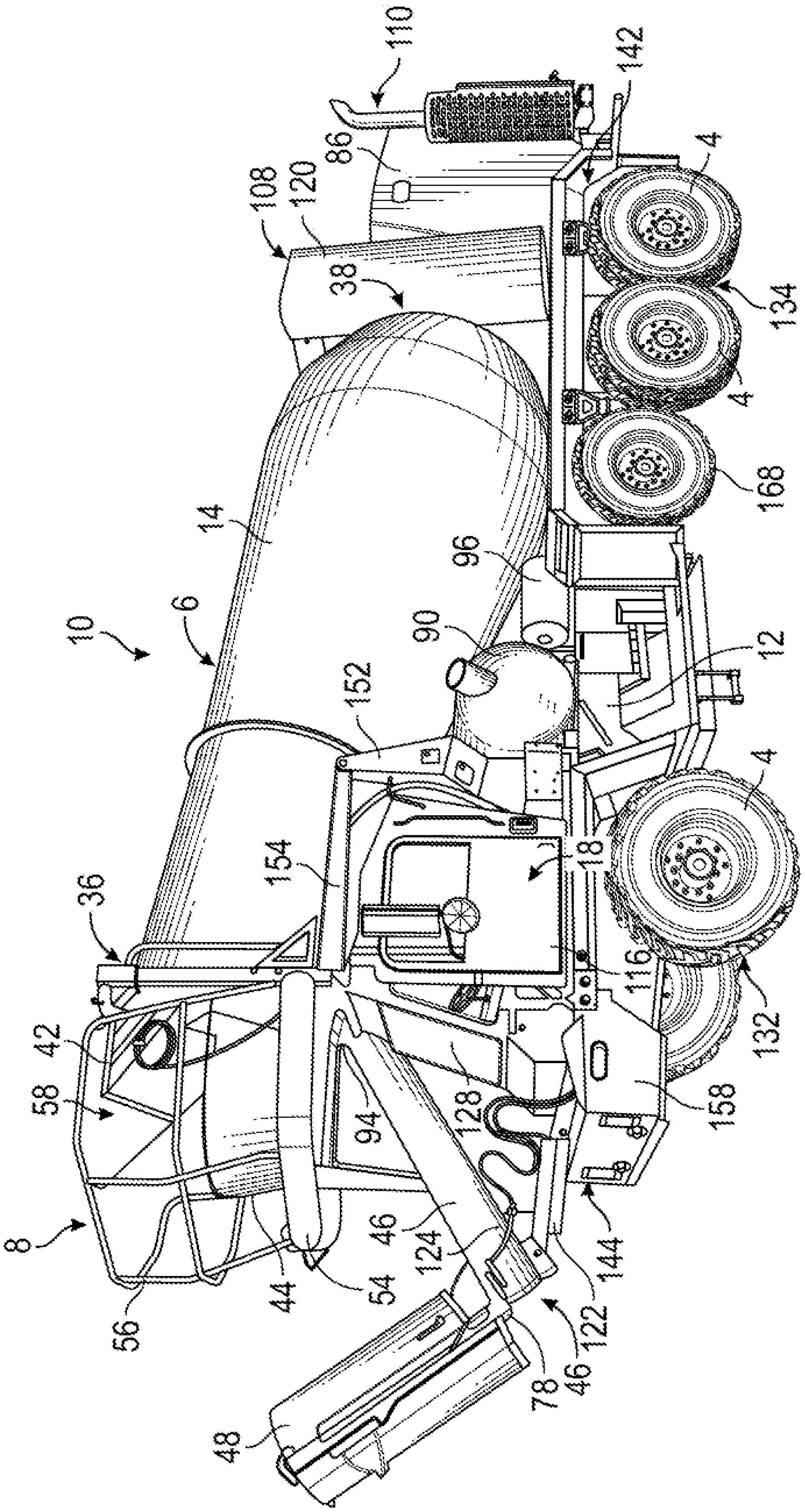
FIG. 2 is a front perspective view of the mixer truck of FIG. 1A, according to an exemplary embodiment.
Figure 3:
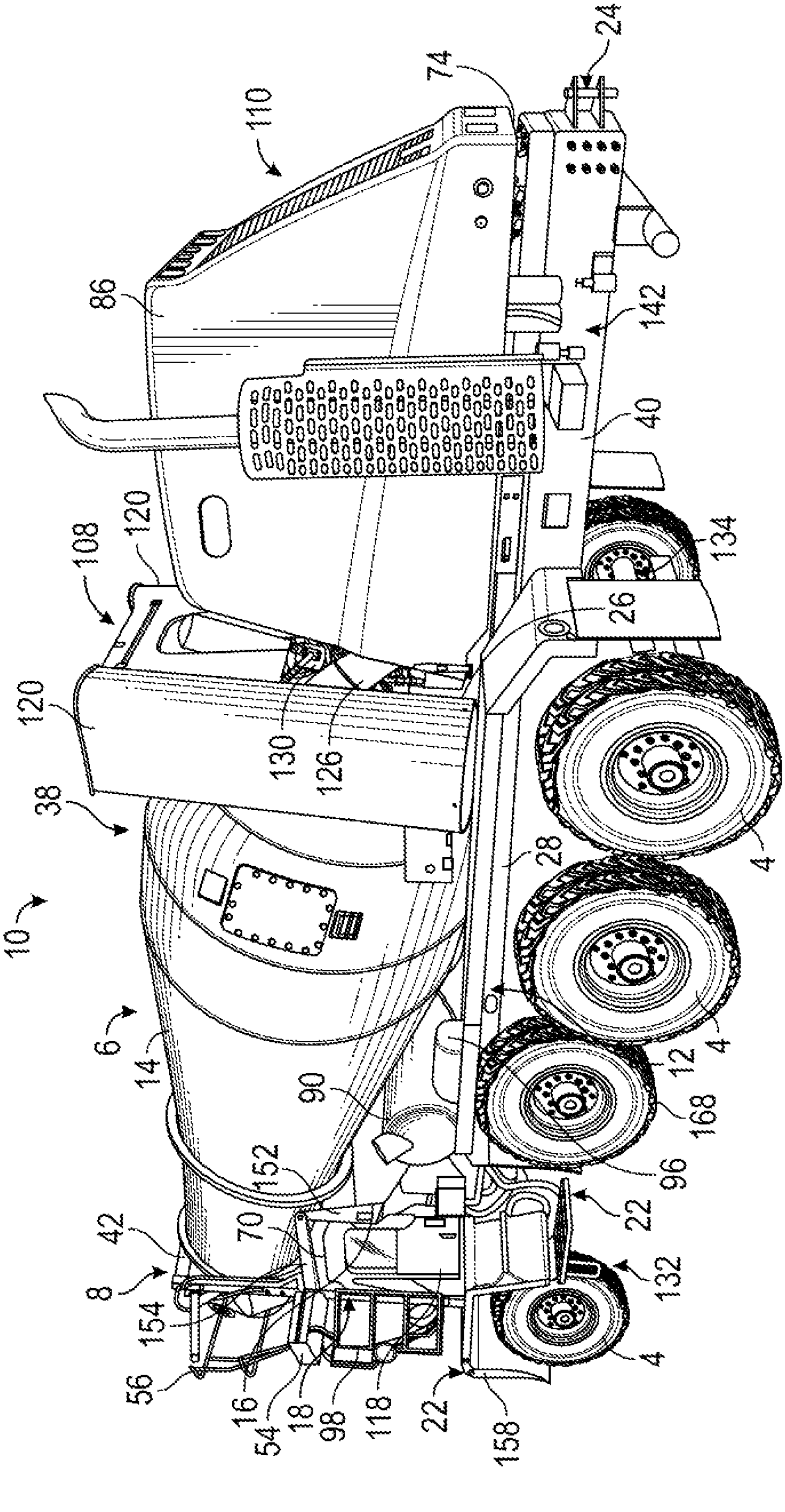
FIG. 3 is a rear perspective view of the mixer truck of FIG. 1A, according to an exemplary embodiment.

According to the exemplary embodiment shown in FIGS. 1-3, a vehicle, shown as mixer vehicle 10, can be configured to transport concrete from a loading location (e.g., a batching plant, etc.) to a point of use (e.g., a worksite, a construction site, etc.). In some embodiments, as shown in FIGS. 1A and 2-3, the mixer vehicle 10 can be a front discharge concrete mixer vehicle. In other embodiments, as shown in FIGS. 1B-1C, the mixer vehicle 10 can be a rear discharge concrete mixer vehicle. The mixer vehicle 10 can include a chassis 12, a drum assembly 6, a hopper assembly 8, a drive system 20, a fuel system 108, and an engine module 110, each of which can include further subcomponents. The mixer vehicle 10 can include various additional engine, transmission, drive, electronic, tractive assembly, braking, steering and/or suspension systems, and hydraulic systems that are configured to support the various components of the mixer vehicle 10. Generally, the chassis 12 can support a mixing drum 14 of the drum assembly 6, a front pedestal 16, a rear pedestal 26, a cab 18, and the engine module 110. Each of the chassis 12, the drum assembly 6, the hopper assembly 8, the drive system 20, the fuel system 108, and the engine module 110 can be configured to facilitate receiving, mixing, transporting, and delivering concrete to a job site via the mixer vehicle 10.

The chassis 12 can include a frame 28 that extends from a front end 22 to a rear end 24 of the mixer vehicle 10. Wheels 4 can be coupled to the frame 28 and moveably support the frame 28 above a ground surface or road. The wheels 4 can be replaced by other ground engaging motive members, such as tracks. In some embodiments, the chassis 12 can include hydraulic components (e.g., valves, filters, pipes, hoses, etc.) coupled thereto that facilitate operation and control of a hydraulic circuit including a drum drive pump and/or an accessory pump. The frame 28 can provide a structural base for supporting the mixing drum 14, the front pedestal 16, the rear pedestal 26, the cab 18, and the engine module 110. In some embodiments, the frame 28 can include a widened front portion that extends over and about the wheels 4 positioned at the front end 22 of the chassis 12 to simultaneously support the cab 18 and serve as a fender for the wheels 4 positioned at the front end 22 of the chassis 12. The frame 28 can include lift eyes or other structures that facilitates lifting along the chassis 12 such that the chassis 12 can be manipulated as a subassembly for assembly and/or maintenance of the mixer vehicle 10. One or more components can be coupled to the chassis 12 using isolating mounts made of a complaint material, such as rubber. The isolating mounts can be configured to reduce the transfer of vibrations between the components and the chassis 12.

The frame 28 can include a pair of frame rails 40 coupled with intermediate cross members, according to an exemplary embodiment. The frame rails 40 can extend in a generally-horizontal and longitudinal direction (e.g., extend within 10 degrees of perpendicular relative to a vertical direction, extend within ten degrees of parallel relative to a ground surface when mixer vehicle 10 is positioned on flat ground, etc.) between the front end 22 and the rear end 24. The frame rails 40 can be elongated "C-channels" or tubular members, according to various exemplary embodiments. In other embodiments, the frame rails 40 can include another type of structural element (e.g., monocoque, a hull, etc.). In still other embodiments, the frame rails 40 can include a combination of elongated C-channels, tubular members, a monocoque element, and/or a hull element. A first frame rail 40 can be disposed along a first lateral side 142 and a second frame rail 40 can be disposed along a second lateral side 144, respectively, of the mixer vehicle 10. By way of example, the first lateral side 142 of the chassis 12 can be the left side of the mixer vehicle 10 (e.g., when an operator is sitting in the cab 18 and positioned to drive the concrete mixer vehicle 10, etc.) and the second lateral side 144 of the chassis 12 can be the right side of the mixer vehicle 10 (e.g., when an operator is sitting in the cab 18 and positioned to drive the concrete mixer vehicle 10, etc.)

The cab 18 can be coupled to the frame ails 40 proximate the front end 22 of the chassis 12. According to various embodiments, the cab 18 (e.g., operator cabin, front cabin, etc.) can be configured to house one or more operators during operation of the mixer vehicle 10 (e.g., when driving, when dispensing concrete, etc.), and can include various components that facilitate operation and occupancy of the mixer vehicle 10 (e.g., one or more seats, a steering wheel, control panels, screens, joysticks, buttons, accelerator, brake, gear lever, etc.). The cab 18 can include a housing 70 that forms the structure of the cab 18. At least one door 116 can be affixed to the housing 70 to allow an operator to enter and exit the cab 18. A windshield 128 can be disposed along a front side of the housing 70, near the front end 22, and above a front bumper 158 of the mixer vehicle 10. The windshield 128 can be configured to provide visibility to the operator while driving the mixer vehicle 10, operating a main chute 46, and completing other tasks. The front bumper 158 can be affixed to a bottom portion of the housing 70. In some embodiments, the front bumper 158 can be affixed to the frame 28 at the front end 22 of the mixer vehicle 10.

A control assembly 76 can be disposed within the cab 18 and can be configured to control one or more components/subcomponents of the mixer vehicle 10. The control assembly 76 can include controls, buttons, joysticks, and other features that control the movement and orientation of the mixer vehicle 10, the hopper assembly 8, the main chute 46, a charge hopper 42, a discharge hopper 44, the mixing drum 14, and/or other components of the mixer vehicle 10. For example, the control assembly 76 can include overhead controls (e.g., in a forward overhead position) that allow an occupant of the cab 18 to toggle a switch from a 'Close' position to an 'Open' position to open and close the charge hopper 42 and/or the discharge hopper 44. In some embodiments, the control assembly 76 can include a user interface with a display and an operator input. The display can be configured to display a graphical user interface, an image, an icon, or still other information. In one embodiment, the display can include a graphical user interface configured to provide general information about the mixer vehicle 10 (e.g., vehicle speed, fuel level, warning lights, etc.). The graphical user interface can also be configured to display a current mode of operation, various potential modes of operation, or still other information relating to a transmission, modules, modes of operation, the drive system 20, and/or other components of the mixer vehicle 10.

An air tank 96 can be coupled to and supported by the chassis 12 and positioned directly beneath the mixing drum 14. The air tank 96 can be configured to store compressed air (e.g., for use in an air brake system, for use when raising and lowering a pusher axle assembly, etc.). A water tank 90 can extend laterally across the length of the chassis 12, forward of the air tank 96. The water tank 90 can be coupled to the frame rails 40 and positioned beneath the mixing drum 14. The water tank 90 can be used to supply water to wash the mixer vehicle 10 after pouring a concrete load and/or to add water to the concrete within the mixing drum 14 at the construction site and/or during transit, among other uses.

The drum assembly 6 can be configured to store, mix and dispense concrete. The drum assembly 6 can include the mixing drum 14, a drum driver 114, and the hopper assembly 8. The mixing drum 14 can extend longitudinally along a majority of the length of mixer vehicle 10 and can be angled relative to the frame rails 40 (e.g., when viewed from the side of mixer vehicle 10). The mixing drum 14 can have a first end 36 that is positioned toward the front end 22 of the mixer vehicle 10 and coupled to the front pedestal 16 (e.g., support post, support column, etc.). The first end 36 can at least partially extend over the cab 18. The first end 36 can define a drum opening 72 in communication with the hopper assembly 8 through which concrete may flow (e.g., between the charge hopper 42, the mixing drum 14, the discharge hopper 44, the main chute 46, and extension chutes 48, etc.). The mixing drum 14 can have a second end 38 that is positioned toward the rear end 24 of the mixer vehicle 10 and coupled to the rear pedestal 26 (e.g., support post, support column, etc.). The mixing drum 14 can be rotatably coupled to front pedestal 16 (e.g., with a plurality of wheels or rollers, etc.) and rear pedestal 26 (e.g., with a drum drive transmission, etc.). Each of the front pedestal 16 and the rear pedestal 26 can be a part of a superstructure of the mixer vehicle 10. The superstructure can further include the frame 28 and the chassis 12. In other embodiments, the mixing drum 14 can be otherwise coupled to the frame rails 40.

In another embodiment, the mixer vehicle 10 can include a drum assembly 6 having a different discharge arrangement. For example, the mixer vehicle 10 can include a rear discharge. A rear discharge mixer vehicle 10 can have the mixing drum 14 with the first end 36 positioned toward the rear end 24 of the mixer vehicle 10 and coupled with the rear pedestal 26. The first end 36 can define the drum opening 72 in communication with the hopper assembly 8 through which concrete can flow. In some embodiments, the mixer vehicle 10 can include a ladder 98 that extends down from the side of the hopper assembly 8 to provide access to the first end 36 of the mixing drum 14. The mixing drum 14 can have the second end 38 positioned toward the front end 22 of the mixer vehicle 10 and coupled with the front pedestal 16.

The front pedestal 16 can include an upper portion 152 and a lower portion 154. The upper portion 152 can be coupled to and supports the hopper assembly 8. The lower portion 154 can be coupled to the frame rails 40 and support the upper portion 152 of the front pedestal 16 and the first end 36 of the mixing drum 14. The rear pedestal 26 can include an upper portion 162 and a lower portion 164. The lower portion 164 can be coupled to the frame rails 40 and support the upper portion 162. The upper portion 162 can support a bottom interface of a drum drive transmission 140 (e.g., a bottom portion of the housing thereof) and/or the second end 38 of the mixing drum 14. In some embodiments, the rear pedestal 26 can include a pair of legs extending between the frame rails 40 and the drum drive transmission 140.

The drum opening 72 at the first end 36 of the mixing drum 14 can be configured to receive a mixture, such as a concrete mixture, or mixture ingredients (e.g., cementitious material, aggregate, sand, etc.) such that the mixture can enter and exit an internal volume 30 of the mixing drum 14. The mixing drum 14 can include a mixing element (e.g., fins, etc.) positioned within the internal volume 30. The mixing element can be configured to (i) agitate the contents of mixture within the mixing drum 14 when the mixing drum 14 is rotated in a first direction (e.g., counterclockwise, clockwise, etc.) and (ii) drive the mixture within the mixing drum 14 out through the drum opening 72 when the mixing drum 14 is rotated in an opposing second direction (e.g., clockwise, counterclockwise, etc.). During operation of the mixer vehicle 10, the mixing elements of the mixing drum 14 can be configured to agitate the contents of a mixture located within the internal volume 30 of the mixing drum 14 as the mixing drum 14 is rotated in a counterclockwise and/or a clockwise direction by the drum driver 114.

The drum driver 114 can be configured to provide an input (e.g., a torque, etc.) to the mixing drum 14 to rotate the mixing drum 14 relative to the chassis 12. The drum driver 114 can be configured to selectively rotate the mixing drum 14 clockwise or counterclockwise, depending on the mode of operation of the mixer vehicle 10 (i.e., whether concrete is being mixed or dispensed). The drum driver 114 can be coupled to a rear or base portion of the second end 38 of the mixing drum 14 and a top end of the lower portion 164 and/or a lower end of the upper portion 162 of the rear pedestal 26. The drum driver 114 can include a transmission, shown as drum drive transmission 140, and a driver, shown as drum drive motor 130, coupled to drum drive transmission 140. The drum drive transmission 140 can extend rearward (e.g., toward the rear end 24 of the mixer vehicle 10, toward the engine module 110, etc.) from the second end 38 of mixing drum 14 and the drum drive motor 130 can extend rearward from drum drive transmission 140. In some embodiments, the drum drive motor 130 can be a hydraulic motor. In other embodiments, the drum drive motor 130 can be another type of actuator (e.g., an electric motor, etc.). The drum drive motor 130 can be configured to provide an output torque to the drum drive transmission 140, according to an exemplary embodiment, which rotates the mixing drum 14 about a rotation axis. The drum drive transmission 140 can include a plurality of gears (e.g., a planetary gear reduction set, etc.) configured to increase the turning torque applied to the mixing drum 14, according to an exemplary embodiment. The plurality of gears can be disposed within a housing. In some embodiments, a drum drive pump and/or accessory pump can be configured to receive rotational mechanical energy and output a flow of pressurized hydraulic fluid to drive one or more components of the mixer vehicle 10.

The hopper assembly 8 can be positioned at the drum opening 72 of the mixing drum 14. The hopper assembly 8 can be configured to introduce materials into and allow the materials to flow out of the internal volume 30 of the mixing drum 14 of the mixer vehicle 10. The hopper assembly 8 can be configured to prevent loss of material or spillage when the material enters and exits the mixing drum 14. The hopper assembly 8 can include the charge hopper 42, the discharge hopper 44, a hopper actuator 66, a platform 54, and the main chute 46, which, in a front discharge mixer vehicle 10, can be positioned above and at least partially forward of the cab 18 of the mixer vehicle 10. The charge hopper 42 can be configured to direct the materials (e.g., cement precursor materials, etc.) into the drum opening 72 of the mixing drum 14. The discharge hopper 44 can be configured to dispense mixed concrete from the internal volume 30 of the mixing drum 14 to the main chute 46 and, ultimately, the desired location.

The platform 54 can include a perforated surface that surrounds the charge hopper 42 and the discharge hopper 44. In some embodiments, the platform 54 can include an asymmetric base. The platform 54 can include platform sides extending beneath the perforated surface. A guardrail 56 can be coupled to the platform 54 and can follow the contour of a periphery of the platform 54. The platform 54 can be situated at a position near the drum opening 72 of the mixing drum 14 to facilitate access by the operator to the drum opening 72, the internal volume 30, the charge hopper 42, the discharge hopper 44, and/or the main chute 46. In some embodiments, the mixer vehicle 10 can include a ladder 98 that extends downward from a side of the platform 54 to allow an operator to climb and reach the platform 54.

The charge hopper 42 can include a first portion 52 that can be configured to receive materials during a charging/loading operation. The first portion 52 can have a rim 58 (e.g., opening) formed at a free end of the first portion 52. The charge hopper 42 can include a second portion 53 aligned with the bottom of the first portion 52. According to an exemplary embodiment, the charge hopper 42 can be selectively repositionable/movable. In some embodiments, the charge hopper 42 can be configured to rotate about a horizontal, lateral axis. In some embodiments, the charge hopper 42 can be configured to raise and lower vertically. Specifically, the charge hopper 42 can be configured to lift, pivot, or otherwise move between a first position (e.g., a lowered position, loading position, a charging position, etc.) and a second position (e.g., a raised position, a dispensing/discharging position, a pivoted position, etc.) above or shifted from the first position. In the first position, the charge hopper 42 can be configured to direct material (e.g., concrete, etc.) from a source positioned above the mixer vehicle 10 (e.g., a batch plant, etc.) through the drum opening 72 and into the internal volume 30 of the mixing drum 14. The first position can also facilitate transport of the mixer vehicle 10 by lowering the overall height of the mixer vehicle 10. In the second position, the charge hopper 42 can move (e.g., lifts, pivots, etc.) away from the drum opening 72 and facilitate material flowing unobstructed out of the drum opening 72 and into the discharge hopper 44 and the main chute 46.

A hopper actuator 66 can be positioned to move the charge hopper 42 between the first position and the second position. The hopper actuator 66 can facilitate selectively controlling movement of the charge hopper 42 between the first position and the second position. The hopper actuator 66 can be coupled to and extend between the charge hopper 42 and the platform 54. In some embodiments, the hopper actuator 66 can be a hydraulic cylinder. In other embodiments, the hopper actuator 66 can be another type of actuators (e.g., a pneumatic cylinder, a lead screw driven by an electric motor, an electric motor, etc.).

When receiving the material, the charge hopper 42 can be in the first position and the main chute 46 can be in a first configuration (e.g., a transport configuration, a stored configuration, etc.). Accordingly, material can be deposited into the charge hopper 42, and the charge hopper 42 can direct the material into the internal volume 30 of the mixing drum 14 through the drum opening 72. While material is being added to the mixing drum 14, the drum driver 114 can be operated to drive the mixing drum 14 to agitate the material and facilitate fully loading/packing the mixing drum 14. Alternatively, the mixing drum 14 can be stationary while material is added to the mixing drum 14. When discharging and the charge hopper 42 is in the second position, the discharge hopper 44 can funnel material from the mixing drum 14 into the main chute 46.

The main chute 46 can function as an outlet of the mixing drum 14 and can be used to direct concrete dispensed from the internal volume 30 of the mixing drum 14 and through the discharge hopper 44 to a target location near the mixer vehicle 10. The main chute 46 can be pivotally coupled to the platform 54 and/or the discharge hopper 44 such that the main chute 46 can be configured to rotate about both a vertical axis and a horizontal axis. The main chute 46 can include a base section 124 that can be pivotally coupled to the platform 54 and/or the discharge hopper 44. An extension chute 48 (e.g., a folding section, a second chute section, etc.) can be pivotally coupled to the distal end of the base section 124. In some embodiments, a plurality of extension chutes 48 can be pivotally connected to one another. One or more removable/detachable extension chutes 68 can be selectively coupled to the distal end of the extension chute 48. The main chute 46 can be selectively reconfigurable between a first configuration (e.g., a storage configuration, a transport configuration, etc.) and a second configuration (e.g., a use configuration, a dispensing configuration, etc.). In the first configuration, (i) the base section 124 can be selectively oriented substantially horizontal and extending laterally outward, (ii) the extension chute 48 can be selectively pivoted relative to the base section 124 and extending substantially vertically, and (iii) the removable extension chutes 68 can be removed from the extension chute 48 and stored elsewhere in the mixer vehicle 10 (e.g., coupled to the chassis 12 beneath the mixing drum 14, etc.). In the first configuration, the main chute 46 can, therefore, minimally obscure the view of an operator positioned within the cab 18 of a front discharge mixer vehicle 10. In the second configuration, (i) the extension chute 48 can be pivoted relative to the base section 124 from the substantially vertical orientation to a substantially horizontal orientation such that the base section 124 and the extension chute 48 are aligned with one another to form a continuous path through which material can flow, and (ii) one or more of the removable extension chutes 68 can be coupled to the distal end of the extension chute 48 to increase the length of the main chute 46 (e.g., to distribute concrete further away from the mixer vehicle 10, etc.).

A first chute actuator 122 (e.g., a chute raising/lowering actuator, etc.) can be coupled to and extend between the main chute 46 (e.g., a distal end thereof, etc.) and the chassis 12. In some embodiments, the first chute actuator 122 can extend between the main chute 46 and the front bumper 158. The first chute actuator 122 can be configured to raise and lower the main chute 46 to control the orientation of the main chute 46 relative to a horizontal plane (e.g., the ground, etc.). In some embodiments, the first chute actuator 122 can be a pair of opposing hydraulic cylinders. In other embodiments, the first chute actuator 122 can be another type of actuator (e.g., a pneumatic cylinder, a lead screw driven by an electric motor, a single hydraulic cylinder, etc.). In some embodiments, the first chute actuator 122 and the main chute 46 can both be configured to rotate about the same or substantially the same vertical axis (e.g., as the main chute 46 is pivoted about the vertical axis as described in more detail herein).

A second chute actuator 94 (e.g., a chute pivot/rotation actuator, etc.) can be coupled to the base section 124 of the main chute 46 and the platform 54. The second chute actuator 94 can be configured to rotate the main chute 46 about a vertical axis. The second chute actuator 94 can be configured to move the distal end of the main chute 46 through an arc along the left, front, and right sides of the chassis 12 (e.g., a 150 degree arc, a 180 degree arc, a 210 degree arc, etc.). In one embodiment, the second chute actuator 94 can be a hydraulic motor. In other embodiments, the second chute actuator 94 can be another type of actuator (e.g., a pneumatic motor, an electric motor, etc.).

A third chute actuator 78 (e.g., a chute folding/unfolding actuator, etc.) can be configured to reposition (e.g., extend and retract, fold and unfold, etc.) the extension chute 48 relative to the base section 124 of the main chute 46. The third chute actuators 78 can be coupled to and extend between the base section 124 and the extension chute 48. In some embodiments, the third chute actuator 78 can include a plurality of actuators positioned to reposition a first extension chute 48 relative to the base section 124 and one or more second extension chutes 48 relative to the first extension chute 48. The first chute actuator 122, the second chute actuator 94, and the third chute actuator 78 can facilitate selectively reconfiguring the main chute 46 between the first configuration and the second configuration. In some embodiments, a controller can be configured to facilitate providing commands to control operation of the first chute actuator 122, the second chute actuator 94, and the third chute actuator 78 to direct the main chute 46 and concrete flow therefrom. In some embodiments, a hopper pump can be coupled to the chassis 12 and configured to provide pressurized hydraulic fluid to power the first chute actuator 122, the second chute actuator 94, and/or the third chute actuator 78. The hopper pump can be a variable displacement pump or a fixed displacement pump. Additionally or alternatively, a pneumatic pump and/or an electrical storage and/or generation device can be used to power one or more of the first chute actuator 122, the second chute actuator 94, and/or the third chute actuator 78.

Once at the job site, the mixer vehicle 10 can be configured to dispense the material to a desired location (e.g., into a form, onto the ground, etc.). The charge hopper 42 can be repositioned into the second position from the first position by the hopper actuator 66. The extension chute(s) 48 can be extended by the third chute actuator(s) 78 to reconfigure the main chute 46 into the second configuration from the first configuration. An operator can then couple one or more removable extension chutes 68 to the distal end of the extension chute 48 to increase the overall length of the main chute 46 (as necessary). Once the main chute 46 is in the second configuration, the operator can control the first chute actuator 122 and/or the second chute actuator 94 to adjust the orientation of the main chute 46 (e.g., about a vertical axis, about a lateral axis, etc.) and thereby direct the material onto the desired location. Once the main chute 46 is in the desired orientation, the operator system can control the drum driver 114 to rotate the mixing drum 14 in the second direction, expelling the material through the drum opening 72, into the discharge hopper 44, and into the main chute 46. The operator can control the speed of the mixing drum 14 to adjust the rate at which the material is delivered through the main chute 46. Throughout the process of dispensing the material, the operator can change the location onto which the material is dispensed by varying the orientation of the main chute 46 and/or by controlling the drive system 20 to propel/move the mixer vehicle 10.

The drive system 20 can be configured to propel the mixer vehicle 10 and can drive other systems of the mixer vehicle 10 (e.g., the drum driver 114, etc.). The drive system 20 can include driven tractive assemblies that include a front axle assembly 132 and a pair of rear axle assemblies 134, each coupled to various wheels 4. In some embodiments, the drive system 20 can include a driveshaft coupled to the front axle assembly 132 and/or the rear axle assemblies 134. The front axle assembly 132 and the rear axle assemblies 134 are coupled to the power plant module 62 through the drive system 20 such that the front axle assembly 132 and the rear axle assemblies 134 at least selectively receive mechanical energy (e.g., rotational mechanical energy) and propel the mixer vehicle 10. In some embodiments, a pusher axle assembly 168 (e.g., tag axle assembly, etc.) can be configured to be raised and lowered to selectively engage the support surface (e.g., based on the loading of the mixer vehicle 10, etc.). Such a configuration distributes the pressure exerted on the ground by the mixer vehicle 10, which lay be required, for example, when traveling through certain municipalities under load.

The power plant module 62 (e.g., prime mover module, driver module, etc.) can be configured to supply rotational mechanical energy to drive the mixer vehicle 10. The power plant module 62 can be coupled to the chassis 12 and positioned near the longitudinal center of the mixer vehicle 10, beneath the mixing drum 14. According to an exemplary embodiment, the power plant module 62 receives a power input from the engine module 110. In some embodiments, the power plant module 62 includes a transmission and/or an electromagnetic device (e.g., an electrical machine, a motor/generator, etc.) coupled to the transmission. In some embodiments, the transmission and the electromagnetic device can be integrated into a single device (e.g., an electromechanical infinitely variable transmission, an electromechanical transmission, etc.). The electromagnetic device can be configured to provide a mechanical energy input to the transmission. By way of example, the electromagnetic device can be configured to supply a rotational mechanical energy input to the transmission (e.g., using electrical energy generated from the mechanical power input provided by the engine module 110, etc.). In some embodiments, the power plant module 62 and/or the drive system 20 can include additional pumps (hydraulic fluid pumps, water pumps, etc.), compressors (e.g., air compressors, air conditioning compressors, etc.), generators, alternators, and/or other types of energy generation and/or distribution devices configured to transfer the energy from the power plant module 62 to other systems.

The fuel system 108 can be configured to provide fuel to the engine module 110 and/or other components of the mixer vehicle 10. Specifically, the fuel system 108 can be configured to provide fuel to an engine 74 of the engine module 110. The engine 74 can use the fuel in an internal combustion process to generate a mechanical power output that is provided to the power plant module 62 (e.g., to generate electricity, to power onboard electric motors used to at least one of rotate wheel and tire assemblies, to drive the transmission etc.) and/or to power the drum driver 114. The fuel system 108 can include one or more valves, hoses, regulators, filters, and/or various other components configured to facilitate providing fuel to the engine 74. The fuel system 108 can include a container 126 (e.g., a vessel, reservoir, tank, etc.) that is configured to store a fluid (e.g., fuel, air, hydraulic fluid, etc.). The container 126 can be disposed behind the drum driver 114 along the chassis 12. In other embodiments, the container 126 can be coupled to a side of the rear pedestal 26. In some embodiments, the container 126 can be coupled to the chassis 12 and positioned directly beneath the mixing drum 14. According to an exemplary embodiment, the container 126 can include a fuel tank that stores fuel used to power the engine 74. In some embodiments, the container 126 additionally or alternatively can include an air tank configured to store compressed air (e.g., for use in an air brake system, for use when raising and lowering the pusher axle assembly 168, etc.). In some embodiments, the container 126 additionally or alternatively can include a hydraulic tank configured to store hydraulic fluid for use in one or more hydraulic circuits (e.g., a hydraulic circuit that includes the drum driver 114, etc.).

A cover assembly 120 including a plurality of cover panels can be positioned between the second end 38 of the mixing drum 14 and the engine module 110. The cover assembly 120 can be disposed around the fuel system 108 (e.g., the container 126, etc.), the drum driver 114, and the rear pedestal 26. The cover assembly 120 can be configured to protect the various internal components from debris. Such debris can be encountered while the mixer vehicle 10 is driven along a roadway, for example. The cover assembly 120 can also protect the various internal components from damage due to collisions with trees, poles, or other structures at a jobsite or while transporting concrete. In some embodiments, all or some of the fuel system 108 can be incorporated under a hood 86 of the engine module 110.

The engine module 110 can be coupled to the frame rails 40 proximate the rear end 24 of the chassis 12. The engine module 110 can be configured to directly, or indirectly, supply the various components of the mixer vehicle 10 with the power needed to operate the mixer vehicle 10. By way of example, the engine module 110 can be configured to provide mechanical energy (e.g., rotational mechanical energy) (i) to one or more components directly (e.g., via a power-take-off, etc.) to drive the one or more components (e.g., a hydraulic pump of the drum driver 114, etc.) and/or (ii) to the power plant module 62 to drive the one or more components indirectly. The engine module 110 can be defined by any number of different types of power sources. According to an exemplary embodiment, the engine module 110 can include the engine 74 coupled to the frame rails 40 and disposed within the hood 86. The engine 74 can include an internal combustion engine configured to utilize one or more of a variety of fuels (e.g., gasoline, diesel, bio-diesel, ethanol, natural gas, etc.) to output mechanical energy. In some embodiments, at least one of the drum drive motor 130, the first chute actuator 122, the second chute actuator 94, and the third chute actuator 78 can be electrically driven (i.e., powered using electrical energy) rather than hydraulically driven.

In some embodiments, the engine module 110 additionally or alternatively can include multiple battery modules (e.g., batteries, capacitors, ultra-capacitors, etc.) spread throughout the mixer vehicle 10, which can cooperate to act collectively as an energy storage device. The engine module 110 can be charged through an onboard energy source (e.g., through use of an onboard generator powered by an internal combustion engine, by operating the electromagnetic device as a generator, during regenerative braking, through an onboard fuel cell, through an onboard solar panel, etc.) or through an external energy source (e.g., when receiving mains power from a power grid, etc.). In some embodiments, the mixer vehicle 10 can be a purely electric vehicle that does not include an internal combustion engine and, as such, can be driven by electrical energy in all modes of operation. In such embodiments, the mixer vehicle 10 cannot include a fuel tank.

Figure 4:
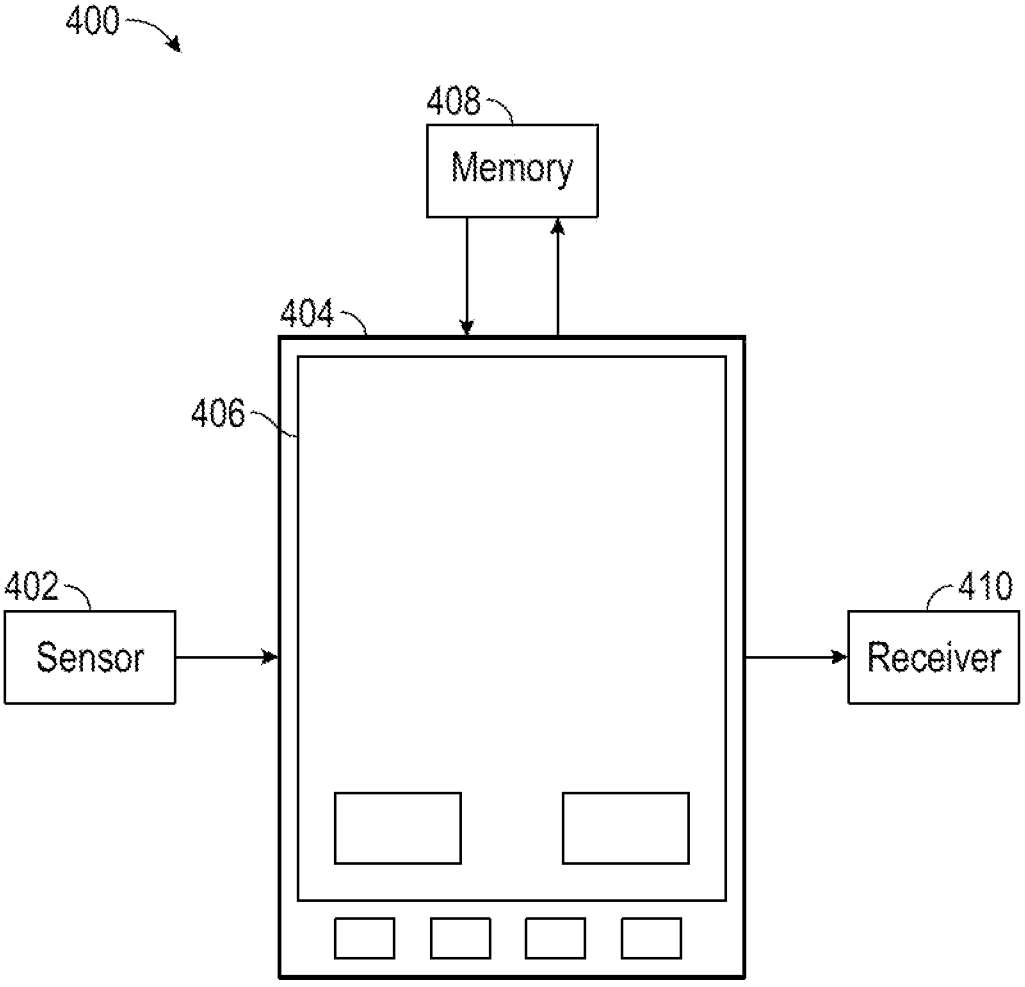
FIG. 4 is a schematic illustration of a remote management system for use in managing the quality of a mixture in a mixer vehicle, according to an exemplary embodiment.

According to an exemplary embodiment, as shown in FIG. 4, a remote management system 400 can be configured to manage the quality of a mixture in a mixer vehicle 10 from a remote location. The remote management system 400 can be configured to monitor and adjust at least one property of a mixture in a mixing drum 14 of a mixer vehicle 10. While at a loading location (e.g., concrete plant), at a dispensing location (e.g., location of a jobsite), or in transit between the loading location and the dispensing location, the remote management system 400 can provide a quality manager the ability to monitor the properties of the mixture within the mixing drum 14 and adjust those properties as the quality manager sees fit. The remote management of the mixture ensures the mixture is appropriate and satisfies required specifications when the mixer vehicle 10 arrives at a jobsite without requiring input from the driver or operator of the mixer vehicle, unless such input is desired.

The remote management system 400 can include at least one sensor 402 and at least one device 404. The sensor 402 can be coupled with the mixer vehicle 10 or any subcomponent of said mixing vehicle 10. The sensor 402 can be any type of sensor capable of detecting or measuring a physical property. A physical property can include a temperature, pressure, location, speed, distance, viscosity, water-cement ratio, and volume, among others. For example, a sensor 402 can include a thermometer configured to detect the temperature of a mixture inside a mixing drum 14 of a mixer vehicle 10. Another sensor 402 can be positioned inside the mixing drum 14 configured to read slump, rotational position, drum speed, entrained air, viscosity, temperature, and water content to generate water to cement ratio. A different sensor 402 can include a global positioning system (GPS) configured to detect a location of the mixer vehicle 10. Another sensor 402 can include a camera configured to capture images or videos of an internal volume 30 of a mixing drum 14. The sensors 402 can be configured to make detections at certain times (e.g., at certain times of day, in certain time intervals, every time the mixer vehicle 10 engages a certain system, when the mixer vehicle 10 is in transit, constantly) or to make detections upon request by a user of the remote management system 400. For example, a mixer vehicle 10 can have a sensor 402 disposed inside the mixing drum 14 to detect the temperature of a mixture in the mixing drum 14. The sensor 402 can be configured to take a temperature reading of the mixture in the mixing drum 14 every five minutes once the mixture is loaded into the mixing drum 14. In another example, the sensor 402 can be configured to take a temperature reading of the mixture only when prompted by a signal from a device 404. For example, the sensor 402 can be communicably connected with the device 404. The sensor 402 can be configured to take a temperature reading every time the device 404 sends a signal to the sensor 402 indicating to the sensor 402 to take the reading.

The device 404 can be any device (e.g., computer, smartphone, tablet) capable of sending and receiving signals, inputs, information, etc. to and from the sensor 402 and other communicable components (e.g., a receiver 410). A connection between the device 404 and the sensor 402 can be a physical connection (e.g., wired) or can be wireless (e.g., via a network, Bluetooth). The device 404 can be configured to receive input signals from the sensors 402. For example, when the sensor 402 detects a physical property, the sensor 402 can generate an input signal indicating information about the physical property and can send that signal to the device 404. The information can include details about the physical property and a time of the detection, among other things. For example, when the sensor 402 detects the temperature of the mixture in the mixing drum 14, the sensor 402 can be configured to generate an input signal indicating the temperature detected (e.g., 70 degrees F.) and the time at which the temperature was detected, and can send the input signal to the device 404.

According to an exemplary embodiment, the device 404 can be configured to receive the input signal. The device 404 can further be configured to display the information indicated in the input signal. For example, the device 404 can include a user interface 406. The user interface 406 can be configured to display the information indicated in the input signal received from the sensor 402. For example, the input signal can indicate information corresponding to a property of a mixture in a mixing drum 14 of a mixer vehicle 10. The device 404 can be configured to display the information corresponding to the property of the mixture on the user interface 406. For example, if the input signal indicates that the temperature of the mixture is 70 degrees F., the user interface 406 of the device 404 can provide a display to a user of the device that the temperature is 70 degrees F. The display can include, but is not limited to, words, numbers, symbols, graphs, charts, pictures, videos, etc. For example, the sensor 402 can make three temperature readings with five minutes between each reading. The first reading can detect a temperature of 70 degrees F. The sensor 402 can send an input signal to the device 404 indicating the temperature is 70 degrees F. at zero minutes. The user interface 406 of the device 404 can be configured to display the temperature of 70 degrees F. The second reading can detect a temperature of 75 degrees F. The sensor 402 can send an input signal to the device 404 indicating the temperature is 75 degrees F. at five minutes. The user interface 406 can be configured to change the previously displayed temperature of 70 degrees F. to the temperature of 75 degrees F. The third reading can detect a temperature of 80 degrees F. The sensor 402 can send an input signal to the device 404 indicating the temperature is 80 degrees F. at ten minutes. The device 404, can be configured to change the previously displayed temperature of 75 degrees F. to the temperature of 80 degrees F. In another example, the user interface 406 can be configured to display all three temperatures on a graph, depicting the change in temperature over time (e.g., a line graph). In another example, the sensors 402 can be configured to continuously detect physical properties such that the values depicted on the user interface 406 of the device 404 are updated in real-time, or close to real-time. For example, a sensor 402 (e.g., a GPS) can be configured to detect the location of the mixer vehicle 10. The sensor 402 can be configured to constantly monitor the location of the mixer vehicle 10 so its current location is always known. The location of the mixer vehicle 10 sent to the device via the input signals can be depicted on the user interface 406 of the device 404 as an indicator on a map. If the sensor 402 can constantly send input signals with new locations of the mixer vehicle 10, the location of the indicator on the map can constantly change accordingly.

The remote management system 400 can include a plurality of sensors 402. Each sensor 402 can be configured to detect a physical property, but the physical property can be different and the timing of making such detections can vary between the sensors 402. For example, a first sensor 402 can be configured to detect information corresponding to a property (e.g., temperature, viscosity, water-cement ratio) of a mixture inside a mixing drum 14 of a mixing vehicle 10. The first sensor 402 can be configured to detect the information corresponding to the property of the mixture every five minutes and to generate and send input signals indicating the property to the device 404 accordingly. A second sensor 402 can be configured to detect information corresponding to a location of the mixer vehicle 10. The information corresponding to the location of the mixer vehicle 10 can include at least one of an address, latitude and longitude coordinates, a distance between the mixer vehicle and a destination, and an estimated duration of time until the mixer vehicle arrives at the destination. The second sensor 402 can be configured to detect the information corresponding to the location of the mixer vehicle 10 every ten minutes and to generate and send input signals indicating the location to the device 404 accordingly. In some embodiments, the frequency of the detections can be changed depending, in part, on the project.

The device 404, via the user interface 406, can be configured to display any combination of physical properties with any combination of information. For example, the user interface 406 can display a list of physical properties the sensors 402 of the remote management system 400 are configured to detect. Each physical property on the list can have a corresponding value. The value can include the information indicated by the input signals (e.g., 70 degrees F. for temperature, 15 rotations per minute (RPM) for drum speed). The device 404 can display a new value for any physical property whenever the device 404 receives an input signal from a sensor 402 indicating new information. In another example, the user interface 406 can display the information corresponding only to one physical property. The user interface 406 can display information from multiple input signals at one time, showing how the information has changed over time. For example, the user interface 406 can be configured to display a graph including a point for every temperature detection made or a curve showing how the rotational speed of the mixing drum 14 has changed.

Figure 5:
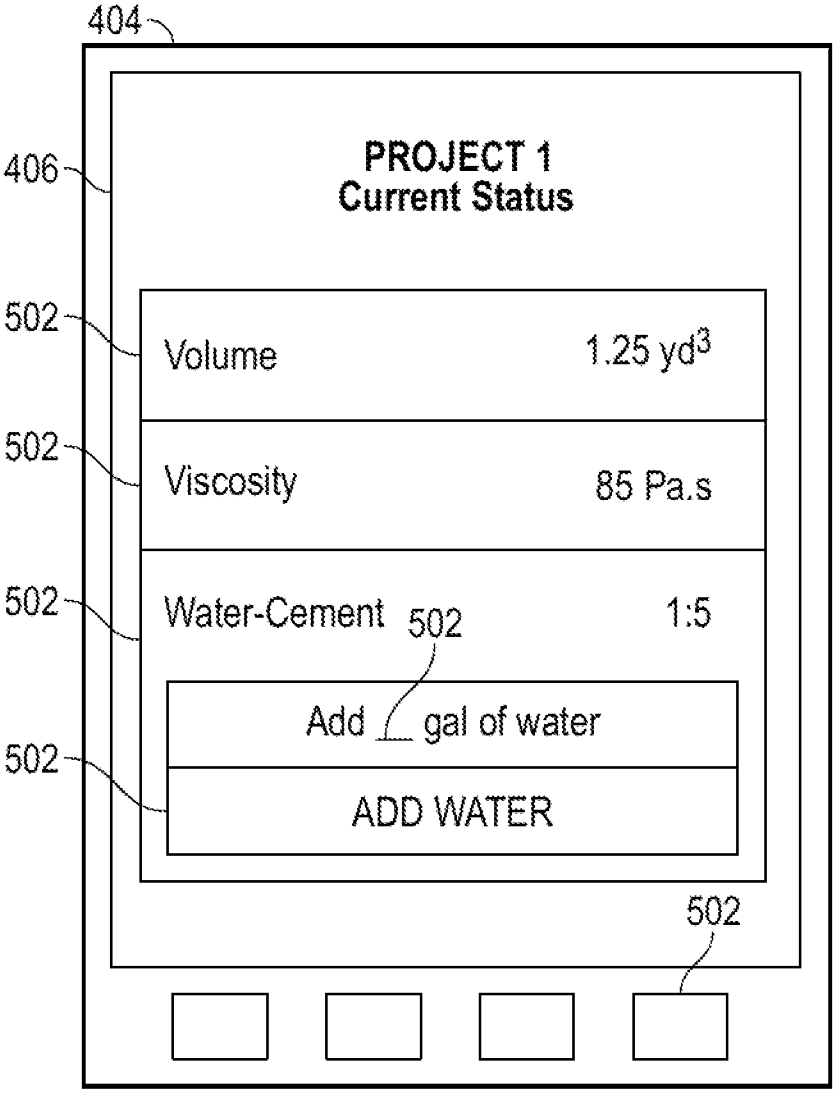
FIG. 5 is a detailed view of a user interface of a device, according to an exemplary embodiment.

According to an exemplary embodiment, as shown in FIG. 5, the device 404 can be further configured to receive an input from a user of the device 404. For example, the device 404 can include at least one interaction point 502. The interaction point 502 can be, for example, a physical button on the device 404, a selectable point on the user interface 406 of the device 404, or a field on the user interface 406 for the user to input a value (e.g., a number, a letter, a symbol). The input from the user of the device 404 can include instructions for adjusting a property of the mixture in the mixing drum 14 of a mixer vehicle 10. For example, the instructions for adjusting the property of the mixture can include adding water to the mixture, adding a chemical to the mixture, changing a speed of the mixing drum 14, or preventing the mixture from being dispensed, among others. For example, if the water-cement ratio is below a specification requirement, the input from the user of the device 404 can include instructions to add a certain amount of water to the mixture or to increase the water-cement ratio by a certain percentage. For example, the user can type in a field 502 on the user interface the number of gallons of water that can be added to the mixture to get the water-cement ratio to satisfy the specification requirement. In another embodiment, the input from the user of the device 404 can include instructions to add a chemical to the mixture within the mixing drum 14. A subcomponent of the mixer vehicle 10 can contain a chemical (e.g., liquid or powder additives) that can be added to the mixing drum 14 to increase durability of the mixture, fix mixture behavior, control setting or hardening of the mixture, or the like.

According to an exemplary embodiment, as shown in FIG. 4, the remote management system 400 can include a memory 408. The memory 408 can be a part of the device 404 or it can be a part of another computer-based system (e.g. a remote server). The memory 408 can be communicably connected to the device 404, either physically or wirelessly. The memory 408 can be configured to retrievably store the information the device 404 receives from the input signals from the sensors 402. For example, as the values depicted on the user interface of the device update as input signals are received, the previous values can be stored in the memory 408. The memory 408 can be configured to allow a user of the device 404 to recall previous values and other details received from the sensor 402 that are no longer depicted on the user interface of the device 404.

According to an exemplary embodiment, the memory 408 can also be configured to retrievably store specification requirements. The specification requirements can include the properties that the mixture needs for a project to be successful. For example, if a concrete slab needs to be poured and set within in eight hours, the mixture might need a temperature of at least 60 degrees F. The 60 degrees F. can be the specification requirement. Any temperature below that specification requirement will require a longer time for the slab to set. With the specification requirements stored in the memory 408, the remote management system 400 can compare the values included in the input signals from the sensors 402 with the specification requirements and alert the user of the device 404 when a property of the mixture is not satisfying a specification requirement. For example, the user interface 406 can display a list of properties of the mixture. Each property can have a corresponding value. If the corresponding value of one of the properties does not satisfy a corresponding specification requirement, the user can be alerted to that property (e.g., the property on the user interface can be highlighted, shown in a different color, bold, flashing).

In another exemplary embodiment, the remote management system 400 can provide a recommendation to the user of the device 404 if a property of the mixture does not satisfy the specification requirement. For example, the user interface 406 of the device 404 can be configured to display a recommendation to the user if a property of the mixture does not satisfy the specification requirement. The recommendation can indicate how to change the property (e.g., what to add, what speed to rotate the drum). The user interface can be configured to receive an input from the user. The input can include either an acceptance or a rejection of the recommendation. For example, if the sensor 402 detects a water-cement ratio that is below the specification requirement, the remote management system 400 can display a recommendation of how much water to add to the mixture on the user interface 406 of the device 404. The user interface 406 can include an interaction point 502 to facilitate the user accepting or rejecting the recommendation. For example, if the recommendation is to add ten gallons of water to the mixture, but the user only wants to add five gallons, the user can reject the recommendation via the interaction point 502 on the user interface 406 and provide a different value as described herein. If the user does agree with the recommendation, the user can instead accept the recommendation. Responsive to accepting the recommendation, the remote management system 400 can cause the appropriate system to add water to the mixing drum 14.

According to an exemplary embodiment, the device 404 can be configured to generate at least one output. The output can be based, in part, on the input signals received from the sensors 402. The output can cause at least one property of the mixture to change. For example, if the information received from the sensor 402 indicates that a property of the mixture does not comply with the specification requirements, the output can cause the property to change to become compliant and satisfy the specification requirements. For example, the output can include instructions for what the systems or subcomponents of the mixer vehicle 10 need to do in order for the property of the mixture to change. For example, if the water-cement ratio of the mixture is too low, the output can include instructions for water from a water tank 90 of the mixer vehicle 10 to be added to the mixture in the mixing drum 14 of the mixer vehicle 10. The instructions can include a specific amount of water such that adding the specific amount of water to the mixture can cause the water-cement ratio to increase such that it satisfies the specification requirement. In another example, the instructions can include a goal water-cement ratio (e.g., increase water-cement ratio from 1:5 to 2:5). The remote management system 400 can be configured to determine how much water that requires. If more than one system or subcomponent of the mixer vehicle 10 will be activated or moved in response to the instructions, the device 404 can generate a plurality of outputs, or a single output can be sent to a plurality of receivers (as described herein).

The output can also be based, in part, on input from a user of the device 404. For example, the input from the user of the device 404 can indicate, via an interaction point 502 on the user interface 406, that a certain amount of water can be added to the mixture in the mixing drum 14 of the mixer vehicle 10 in order to correct the water-cement ratio (e.g., the user can indicate to add ten gallons to the mixture by typing in "10 gallons" in a field on the user interface). The output is configured to cause that amount of water to be added to the mixture. In another example, the user can instead indicate how long a water supply system can add water to the mixture, instead of indicating the amount of water. For example, the user can indicate the water supply system should activate for twenty seconds such that water is being added to the mixture for those twenty seconds. Alternatively, the device 404 can include an interaction point 502 configured to instantaneously activate and deactivate a system or subcomponent of the mixer vehicle 10. For example, when the user selects the interaction point 502 (touch and release the interaction point 502 or touch and hold the interaction point 502), the water supply system can activate and add water to the mixture in the mixing drum 14. When the user deselects the interaction point 502 (touch and release a second time or release the hold), the water supply system can deactivate and stop adding water to the mixture. A sensor 402 can be configured to detect the water-cement ratio as the water is being added to the mixture such that the user knows when to stop adding water (e.g., deselect the interaction point 502).

In another example, if a property of the mixture remains noncompliant with the specification requirements when the mixer vehicle 10 arrives at a destination, the input from the user of the device 404 can include instructions to prevent the mixture from being dispensed (e.g., give the mixture more time to mix). For example, a sensor 402 can be configured to detect information corresponding to a location of the mixer vehicle 10. The information corresponding to the location of the mixer vehicle 10 can include a distance between the mixer vehicle 10 and a destination and an estimated duration of time until the mixer vehicle 10 arrives at the destination. If the mixer vehicle 10 is at the destination, the distance between the mixer vehicle 10 and the destination can be zero miles and the estimated duration of time until the mixer vehicle 10 arrives at the destination can be zero minutes. If, when the sensors 402 detect the mixer vehicle 10 is at the destination, but a property of the mixture in the mixing drum 14 does not satisfy the corresponding specification requirement, the input of the user of the device 404 can include instructions to inhibit the mixture from being dispensed from the mixer vehicle 10. Such instructions can include, for example, inhibiting a drum driver 114 from rotating the mixing drum 14 in a dispensing direction to at least temporarily inhibit the mixer vehicle from dispensing the mixture. This can give the mixture more time to mix and acquire the desired properties. The device 404 can be configured to generate an output comprising the instructions to inhibit the drum driver 114 from reversing a rotation of the mixing drum to at least temporarily inhibit the mixer vehicle 10 from dispensing the mixture.

According to an exemplary embodiment, the remote management system 400 can include at least one receiver 410. The receiver 410 can be configured to receive the output generated by the device 404 and to control at least one subcomponent or system of the mixer vehicle 10 according to instructions included in the output. The receiver 410 to receive the output can be associated with a subcomponent or system of the mixer vehicle 10 configured to perform a function applicable to the instructions included in the output. The instructions included in the output can include at least one of adding water to the mixture, adding a chemical to the mixture, changing a speed of the mixing drum, and preventing the mixture from being dispensed. For example, if the temperature of the mixture is above a corresponding specification requirement, the output can include instructions to add water to the mixture. Per the instructions, a receiver 410 associated with a water supply system can activate the water supply system so that water from a water tank 90 can be added to the mixture in the mixing drum 14. Alternatively, if the temperature of the mixture is below a specification requirement, the output can include instructions for a drum driver 114 to increase a rotational speed of the mixing drum to increase the temperature. Per the instructions, a receiver 410 associated with the drum driver 114 can take control of the drum driver 114 and adjust the rotational speed accordingly. With any instructions, the receiver 410 can be configured to detect when the instructions have been completed (e.g., the temperature of the mixture satisfies the specification requirement, the correct amount of water has been added to the mixture) and can return the activated or adjusted system or subcomponent to its original state (e.g., turn off the water supply system). The same process can be applied to any system or subcomponent of the mixer vehicle.

According to an exemplary embodiment, a plurality of receivers 410 can receive an output if several systems or subcomponents of the mixer vehicle 10 need to be activated or moved in order to perform the instructions in the output. For example, a user can indicate that more water needs to be added to the mixture, but due to the additional water, the speed of the rotation of the mixing drum 14 needs to increase as well. As such, the output sent from the device 404 can include instructions to activate a water supply system to add water to the mixing drum 14 and to adjust a drum driver 114 to increase the rotational speed of the mixing drum 14. A first receiver 410 associated with the water supply system (e.g., capable of controlling the water supply system) can receive the output and a second receiver 410 associated with the drum driver 114 (e.g., capable of controlling the drum driver 114) can also receive the output.

Figure 6:
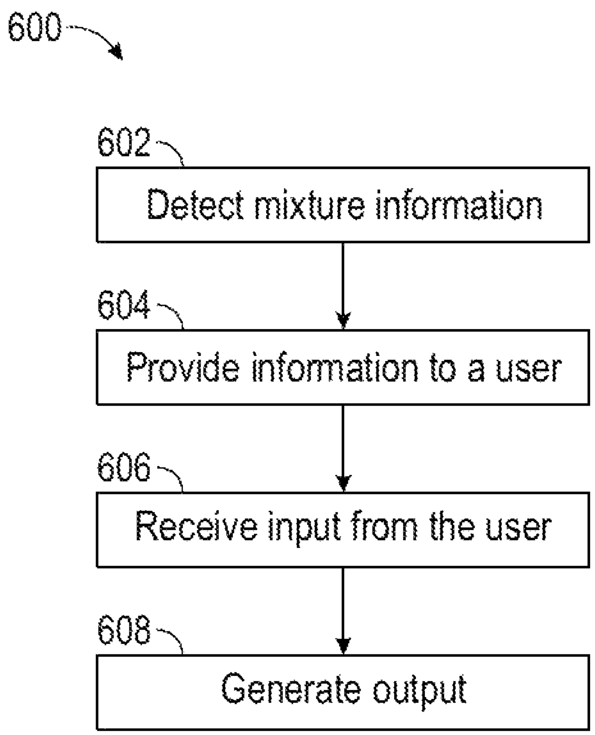
FIG. 6 is a flow diagram of a method of remotely managing the quality of a mixture in a mixer vehicle, according to an exemplary embodiment.

According to an exemplary embodiment, as shown in FIG. 6, method 600 is a method of remotely managing the quality of a mixture in a mixer vehicle 10. Method 600 can allow a remote quality manager to monitor and adjust the properties of a mixture in a mixer vehicle from a remote location. At operation 602, a remote management system 400 can detect information corresponding to a mixture. At operation 604, the remote management system 400 can provide the information corresponding to the mixture to a user of the remote management system 400. At operation 606, the remote management system 400 can receive input from the user. At operation 608, the remote management system 400 can generate an output. Operation 602 can include a sensor 402 of the remote management system 400 detecting a physical property related to a mixture in a mixer vehicle 10. For example, a sensor 402 can detect hydraulic pressure, drum speed, slump/viscosity, water-cement ratio, volume, temperature, location, or distance to a destination, among others. For example, the sensor 402 can be a thermometer detecting the temperature of the mixture. In another example, the sensor 402 can be a moisture analyzer detecting a water-cement ratio of the mixture. In another example, the sensor 402 can be a GPS detecting information corresponding to a location of the mixer vehicle (i.e. the location of the mixture).

Detecting the information corresponding to the mixture can be done automatically or upon request. For example, a supplier or user of the sensor 402 can program the sensor 402 to make detections at certain times. For example, the sensor 402 can automatically make a detection every 5 minutes when a drive system 20 of a mixer vehicle 10 is engaged (e.g., the sensor 402 detects the temperature of the mixture every five minutes when the mixer vehicle is in transit to a jobsite) or the sensor 402 can automatically make continuous detections when a drum driver 114 is rotating the mixing drum 14 (e.g., the sensor 402 constantly updates the rotational speed of the mixing drum 14). A sensor 402 can make a detection upon request by, for example, receiving a signal from a device 404 to make a detection. For example, a user of the device 404 can select an interaction point 502 on a user interface 406 of the device 404 to actuate the sensor 402 to make a detection upon command (e.g., every time the user selects the interaction point 502, the sensor 402 makes a detection).

According to an exemplary embodiment, operation 604 can include the remote management system 400 providing the information detected at operation 602 to a user of the remote management system 400. Providing the information can include the sensor 402 generating an input signal indicating the information. For example, after the sensor 402 detects a physical property (e.g., a temperature of the mixture), the sensor 402 can generate an input signal indicating the physical property (e.g., temperature is 70 degrees F.). The input signal can also include other information corresponding to the detection, including, for example, time of the detection. Providing information to a user can also include the sensor 402 sending the input signal to the device 404 and the device 404 receiving the input signal. The device 404 can be any device capable of sending and receiving signals, inputs, information, etc. to and from the sensor 402 (e.g., computer, smartphone, tablet). The device 404 can also be any device capable of providing the received information to a user of the device 404. For example, device 404 can include a user interface 406 capable of displaying the information received via the input signal from the sensor 402. For example, the user interface 406 can display at least one physical property along with the corresponding information about the one physical property detected by at least one sensor 402. In another example, the user interface 406 can display a plurality of physical properties and a plurality of corresponding information. The information can be displayed with words, numbers, symbols, maps, charts, graphs, images, or videos, among others. The information can be displayed in any configuration such that the user of the device 404 can understand the information.

According to an exemplary embodiment, operation 606 can include the remote management system 400 receiving input from a user of the device 404. Receiving input from a user can include comparing the information received from the input signal from the sensor 402 with a corresponding specification requirement. A specification requirement can define the properties needed in order to complete a project according to a specified standard. For example, the project can require a certain strength of concrete when it is fully cured. The strength of the concrete can be determined by the water-cement ratio of the mixture. The specification requirement can specify a certain water-cement ratio (or concrete strength). When the sensor 402 detects the water-cement ratio of the mixture, that information can be compared to the specification requirement (e.g., will the water-cement ratio provide a strong enough concrete when cured?). Based, in part, on this comparison, the user of the device 404 can provide an input. The input can include instructions for adjusting at least one property of the mixture if the at least one property does not satisfy the specification requirement. For example, the instructions for adjusting the at least one property of the mixture can include at least one of adding water to the mixture, adding a chemical to the mixture, changing a speed of the mixing drum 14, and preventing the mixture from exiting the mixing drum 14. For example, if the water-cement ratio is below the specification requirement, the input can include instructions to add water to the mixture via a water tank 90 on the mixer vehicle 10. The instructions, for example, can include how much water to add (e.g., add ten gallons), how long to pump water into the mixing drum 14 (e.g., activate pump for two minutes), or the desired water-cement ratio (e.g., increase water-cement ratio from 1:5 to 2:5). To provide this input, the device 404 can include at least one interaction point 502. The interaction point 502 can be any portion of the device 404 that allows the user to input information. For example, the interaction point 502 can include a button, a toggle switch, a selectable point on the user interface, or a field on the user interface to type or write, among others. The user can use any combination of the interaction points 502 to provide the input.

According to an exemplary embodiment, operation 608 can include the remote management system 400 generating an output. The output can cause at least one property of the mixture in the mixing drum 14 to change. For example, if, at operation 606, the user determines that a property of the mixture does not satisfy the corresponding specification requirement, the output can include instructions to correct that property. For example, the output can include instructions indicating what systems or subcomponents of the mixer vehicle 10 need to do in order for the property of the mixture to change. For example, the output can indicate that a drum driver 114 can increase the rotational speed of the mixing drum 14 such that the temperature of the mixture increases to satisfy the specification requirements. The instructions can, for example, indicate a specific speed or a desired temperature. The output can be based, in part, on the input received from the sensor 402 or on the input received from the user, or a combination thereof. If the user input includes instructions for correcting a property of the mixture, the output can include those instructions. For example, a sensor 402 can detect information corresponding to a water-cement ratio of the mixture. The sensor 402 can send an input signal to the device 404 indicating the water-cement ratio detected. The information received from the sensor 402 can be displayed on the user interface 406 of the device 404. The user can compare the information with the specification requirements. If the water-cement ratio is below the specification requirement, the user can provide an input indicating instructions to add water to the mixing drum 14. The output can then include instructions for water from a water tank 90 of the mixer vehicle to be added to the mixture in the mixing drum 14 of the mixer vehicle 10 to increase the water-cement ratio of the mixture such that it satisfies the specification requirement.

According to an exemplary embodiment, operation 608 can include a receiver 410 receiving the output generated by the remote management system 400. The receiver 410 can receive the output generated by the remote management system 400 and control at least one system or subcomponent of the mixer vehicle 10 according to instructions included in the output. The receiver 410 can be associated with the system or subcomponent of the mixer vehicle 10 configured to perform a function applicable to the instructions included in the output. For example, the output can include instructions to increase the rotational speed of the mixing drum 14. The receiver 410 to receive the output can be associated with a drum driver 114 (e.g., can control the drum driver 114) of the mixer vehicle 10 since the drum driver 114 can control the rotation of the mixing drum 14. If the instructions included in the output require performance of multiple systems or subcomponents of the mixer vehicle 10, then more than one receiver 410 can receive the output and activate or move an associated system or subcomponent accordingly.

According to an exemplary embodiment, operation 608 can include correcting a property of a mixture in a mixing drum 14 of a mixer vehicle 10. Correcting a property of a mixture can include adjusting a property of the mixture that originally does not satisfy a specification requirement such that it does satisfy the specification requirement. Responsive to receipt of the output, the receiver 410 can activate or move systems and subcomponents of the mixer vehicle according to the instructions included in the output. Such activation or movement can correct the property of the mixture such that it satisfies the specification requirement and can be used to successfully complete a project.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, EPROM, EEPROM, or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the autonomous control system as shown in the various exemplary embodiments is illustrative only. Additionally, any element disclosed in one embodiment may be incorporated or utilized with any other embodiment disclosed herein. Although only one example of an element from one embodiment that may be incorporated or utilized in another embodiment has been described above, it should be appreciated that other elements of the various embodiments may be incorporated or utilized with any of the other embodiments disclosed herein.

What is claimed is:

1. A mixer vehicle system, comprising:

a mixer vehicle, comprising:

a chassis supporting a plurality of wheels; and a vehicle body supported by the chassis, wherein the vehicle body comprises a plurality of subcomponents, the plurality of subcomponents comprising:

a cabin configured to house one or more operators of the mixer vehicle;

a mixing drum defining an aperture and an internal volume, wherein the mixing drum is movable relative to the chassis to agitate a mixture stored in the mixing drum;

a charge hopper positioned proximate the aperture, wherein the charge hopper is movable relative to the aperture; and a chute positioned proximate the aperture, beneath the charge hopper, wherein the chute is pivotally coupled to the mixer vehicle; and a remote management system configured to monitor and adjust at least one property of the mixture, wherein the remote management system comprises:

a sensor coupled with the mixer vehicle, the sensor configured to detect information corresponding to the at least one property of the mixture and generate an input signal indicating the information; and a device communicably coupled with the sensor, the device comprising a user interface and a memory storing one or more specification requirements associated with the at least one property of the mixture thereon that, when retrieved by the device, cause the device to:

receive, from the sensor, information corresponding to the at least one property of the mixture;

generate a recommendation indicating how to change the at least one property of the mixture based on the at least one property failing to satisfy an associated specification requirement;

operate the user interface to display the recommendation to a user;

receive a first user input indicating an acceptance or a rejection of the recommendation; and operate at least one component of the plurality of subcomponents to cause the at least one property of the mixture to change based on the first user input indicating the acceptance of the recommendation.

2. The system of claim 1, wherein operating the at least one component causes the at least one property of the mixture to satisfy the associated specification requirement.

3. The system of claim 1, wherein the one or more specification requirements associated with the at least one property of the mixture that, when retrieved by the device, further cause the device to display the information corresponding to the at least one property of the mixture on the user interface of the device.

4. The system of claim 3, wherein the one or more specification requirements associated with the at least one property of the mixture that, when retrieved by the device, further cause the device to receive a second user input comprising instructions for adjusting the at least one property of the mixture.

5. The system of claim 4, wherein the instructions for adjusting the at least one property of the mixture comprise at least one of adding water to the mixture, adding a chemical to the mixture, changing a speed of the mixing drum, and preventing the mixture from being dispensed.

6. The system of claim 5, further comprising a receiver configured to receive the instructions and to control at least one of the plurality of subcomponents of the mixer vehicle according to the instructions.

7. The system of claim 1, wherein the at least one property of the mixture is a water-cement ratio, wherein the water-cement ratio is below the associated specification requirement.

8. The system of claim 7, wherein the recommendation comprises instructions for water from a water tank of the mixer vehicle to be added to the mixture in the mixing drum of the mixer vehicle to increase the water-cement ratio of the mixture such that it satisfies the associated specification requirement.

9. The system of claim 1, wherein the one or more specification requirements associated with the at least one property of the mixture that, when retrieved by the device, further cause the device to:

operate the user interface to request an instruction based on the first user input indicating the rejection of the recommendation;

receive a second user input comprising the instruction, the instruction including an amount of water to be added to the mixture in the mixing drum of the mixer vehicle; and operating a water tank of the mixer vehicle to add the amount of water from the second user input to the mixture in the mixing drum.

10. The system of claim 1, wherein the at least one property of the mixture is a temperature, wherein the temperature is above the associated specification requirement, and wherein the recommendation comprises instructions for water to be added to the mixing drum to decrease the temperature of the mixture such that it satisfies the associated specification requirement.

11. The system of claim 1, wherein the at least one property of the mixture is a temperature, wherein the temperature is below the associated specification requirement, and wherein the recommendation comprises instructions for a drum driver to increase a speed of the mixing drum to cause the temperature of the mixture to increase such that it satisfies the associated specification requirement.

12. The system of claim 1, wherein operating the at least one component of the plurality of subcomponents to cause the at least one property of the mixture to change comprises transmitting an output to a receiver, wherein the receiver is configured to receive the output and to control the at least one of the plurality of subcomponents of the mixer vehicle according to instructions included in the output, wherein the instructions comprise at least one of adding water to the mixture, adding a chemical to the mixture, changing a speed of the mixing drum, and preventing the mixture from being dispensed.

13. The system of claim 1, wherein the sensor is a first sensor;

further comprising a second sensor configured to detect information corresponding to a location of the mixer vehicle and to generate an input signal indicating the location.

14. The system of claim 13, wherein the information corresponding to the location of the mixer vehicle includes a distance between the mixer vehicle and a destination and an estimated duration of time until the mixer vehicle arrives at the destination.

15. The system of claim 14, wherein the distance between the mixer vehicle and the destination is zero miles and the estimated duration of time until the mixer vehicle arrives at the destination is zero minutes; and wherein the recommendation comprises instructions to inhibit a drum driver from rotating the mixing drum in a dispensing direction to at least temporarily inhibit the mixer vehicle from dispensing the mixture, giving the mixture more time to mix.

* * * * *